(12) United States Patent
Sasaki (10) Patent No.: US 9,321,336 B2
(45) Date of Patent: Apr. 26, 2016

(54) AUTOMOBILE UMBRELLA APPARATUS

(71) Applicant: Jonathan Sasaki, Captain Cook, HI (US)

(72) Inventor: Jonathan Sasaki, Captain Cook, HI (US)

( * ) Notice: Subject to any disclaimer, the term of this patent is extended or adjusted under 35 U.S.C. 154(b) by 0 days.

(21) Appl. No.: 14/798,581

(22) Filed: Jul. 14, 2015

(65) Prior Publication Data

US 2016/0015137 A1    Jan. 21, 2016

Related U.S. Application Data

(60) Provisional application No. 62/027,216, filed on Jul. 21, 2014.

(51) Int. Cl.
| | |
|---|---|
| *A45B 11/00* | (2006.01) |
| *B60J 11/08* | (2006.01) |
| *A45B 17/00* | (2006.01) |
| *A45B 25/00* | (2006.01) |
| *A45B 23/00* | (2006.01) |
| *B60R 11/00* | (2006.01) |

(52) U.S. Cl.
CPC .................. *B60J 11/08* (2013.01); *A45B 11/00* (2013.01); *A45B 17/00* (2013.01); *A45B 25/00* (2013.01); *A45B 2023/0025* (2013.01); *A45B 2200/1009* (2013.01); *B60R 2011/004* (2013.01); *B60R 2011/0042* (2013.01)

(58) Field of Classification Search
CPC ............ B60J 11/00; B60J 11/06; B60J 11/08; B60R 2011/004; B60R 2011/0042; A45B 2023/0025; A45B 2200/1009
USPC .............................. 135/88.05, 88.09; 248/208
See application file for complete search history.

(56) References Cited

U.S. PATENT DOCUMENTS

| | | | | | |
|---|---|---|---|---|---|
| 2,273,492 | A | * | 2/1942 | Malmer | B60R 7/08 224/482 |
| 2,398,748 | A | * | 4/1946 | Lange | B60R 13/00 116/28 R |
| 2,405,701 | A | * | 8/1946 | Lange | B60R 13/00 224/482 |
| 5,150,728 | A | * | 9/1992 | Stark | B60R 11/00 135/16 |
| 5,287,871 | A | * | 2/1994 | Trice | B60J 11/00 135/16 |
| 5,385,161 | A | * | 1/1995 | Loker | A45B 11/00 135/15.1 |
| 6,405,742 | B1 | * | 6/2002 | Driscoll | A45B 17/00 135/20.1 |
| 6,959,715 | B2 | * | 11/2005 | Siegel | A45B 11/00 135/16 |
| 7,967,274 | B1 | * | 6/2011 | Stallings, Jr. | A45B 11/00 248/206.3 |
| 9,090,153 | B1 | * | 7/2015 | Boyd | B60J 11/06 |
| 2009/0205692 | A1 | * | 8/2009 | Sapp | A45B 11/00 135/16 |
| 2012/0168598 | A1 | * | 7/2012 | Walker | B60R 7/12 248/539 |

* cited by examiner

*Primary Examiner* — Robert Canfield
(74) *Attorney, Agent, or Firm* — Dale J. Ream (57) ABSTRACT

An automobile umbrella apparatus for use with an automobile window includes a base member having an arch shape that nests atop the lower window frame of an automobile. A mounting shaft extends upwardly from the base member is length adjustable to span between the lower and upper window frame members of an automobile. A mounting fin is coupled to the mounting shaft proximate a distal end and has a wedge shape configured to engage an upper window frame member in a friction fit relationship. An umbrella pole includes a proximal end pivotally coupled to the upper end of the mounting shaft and an opposed distal end. An umbrella canopy is operatively coupled to the distal end of the umbrella pole and movable between a retracted configuration loosely surrounding the umbrella pole and a deployed configuration extending away from the umbrella pole so as to shield or shade an area thereunder.

20 Claims, 8 Drawing Sheets

AUTOMOBILE UMBRELLA APPARATUS

REFERENCE TO RELATED APPLICATION

This non-provisional patent application claims the benefit of Provisional application Ser. No. 62/027,216 filed on Jul. 21, 2014, titled "Automobile Umbrella."

BACKGROUND OF THE INVENTION

This invention relates generally to umbrellas and, more particularly, to a weather shielding apparatus that is configured both for traditional use as an umbrella and mounted to the window frame of a door of an automobile and configured to shield rain and sun from an open automobile window.

Parking an automobile in a parking lot or driveway with all the windows completely closed during periods of high heat, humidity, or sunshine inevitably results in the interior cabin becoming extremely hot for a driver or passengers when the car is opened up. In addition, the well-being of pets or children left in the car is at significant health risk if the vehicle becomes too hot as a result of windows being closed. Of course, leaving a car with a window completely open risks the interior or personal contents getting wet and damaged if rain is experienced. The issue of a car becoming burdensomely hot or wet is especially problematic when one or more persons are waiting in the car to pick someone up, eating a meal in one's car, resting or napping in one's car, or the like.

Various devices are known in the prior art for shielding the interior of an automobile from intense sunlight, such as window or windshield shades attached by suction, adhesive, or the like. Although presumably effective for their intended purposes, the existing devices and patent proposals block a person's vision from the interior compartment and do not protect the interior from falling rain.

Therefore, it would be desirable to have an automobile umbrella apparatus that may be mounted to the window frame elements of an automobile door and configured to shield the interior of the automobile, its contents, and its waiting passengers from overhead sunlight and from rain. Further, it would be desirable to have an automobile umbrella apparatus that may be quickly mounted to an automobile door when the window is retracted and using a spring-biased configuration wedged between window frame elements for a secure attachment. In addition, it would be desirable to have an automobile umbrella apparatus that benefits persons, pets, and contents from weather elements while parked and waiting in their vehicle.

SUMMARY OF THE INVENTION

An automobile umbrella apparatus according to the present invention for attachment to an automobile door having opposed lower and upper window frame members includes a base member having an arch shape configured to selectively nest atop the lower window frame of an automobile. A mounting shaft includes a lower end coupled to the base member and an opposed upper end displaced from the lower end, the mounting shaft being length adjustable to span between the lower and upper window frame members. A mounting fin is coupled to the mounting shaft proximate the distal end and having a wedge shape configured to engage the upper window frame member in a friction fit relationship. An umbrella pole includes a proximal end pivotally coupled to the upper end of the mounting shaft and a distal end displaced from the proximal end. An umbrella canopy is operatively coupled to the distal end of the umbrella pole and movable between a retracted configuration closely surrounding the umbrella pole and a deployed configuration extending away from the umbrella pole so as to shield or shade an area thereunder.

Therefore, a general object of this invention is to provide an automobile umbrella apparatus for selectively shield an open automobile window, when mounted, from weather elements such as a sunlight and rain.

Another object of this invention is to provide an automobile umbrella apparatus, as aforesaid, having a mounting shaft that is length adjustable and adapted to be mounted securely between lower and upper window frame elements of an automobile door when the window therein is opened completely.

Still another object of this invention is to provide an automobile umbrella apparatus, as aforesaid, having an umbrella canopy that may be deployed outside or above an automobile door window and adjusted to shield the interior of the automobile, its contents, or passengers waiting inside from the effects of sun and rain.

Yet another object of this invention is to provide an automobile umbrella apparatus, as aforesaid, that may be used in the manner of a traditional umbrella when not coupled to an automobile door.

A further object of this invention is to provide an automobile umbrella apparatus, as aforesaid, that is easy and quick to install and uninstall from an automobile door.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
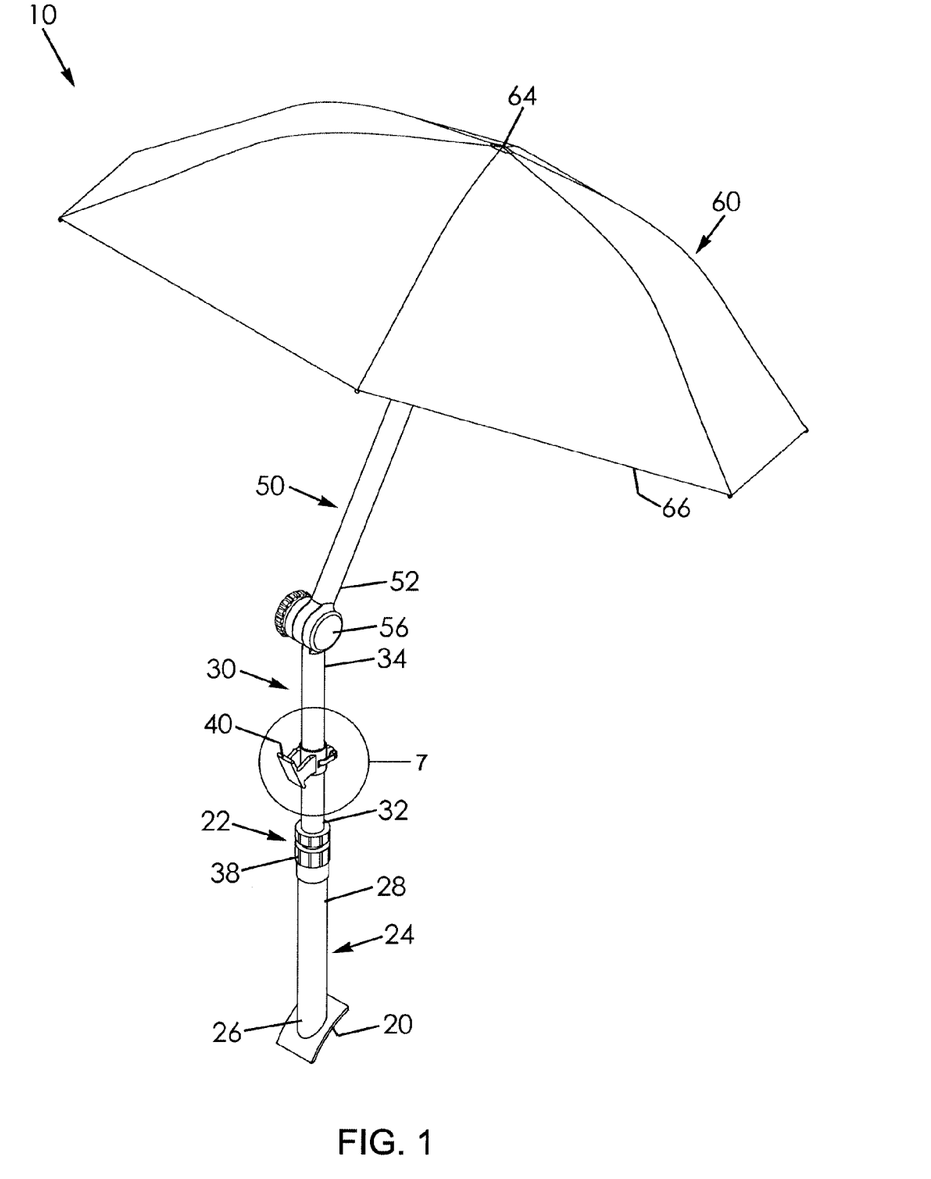
FIG. 1 is a perspective view of an automobile umbrella apparatus according to a preferred embodiment of the present invention.
Figure 2:
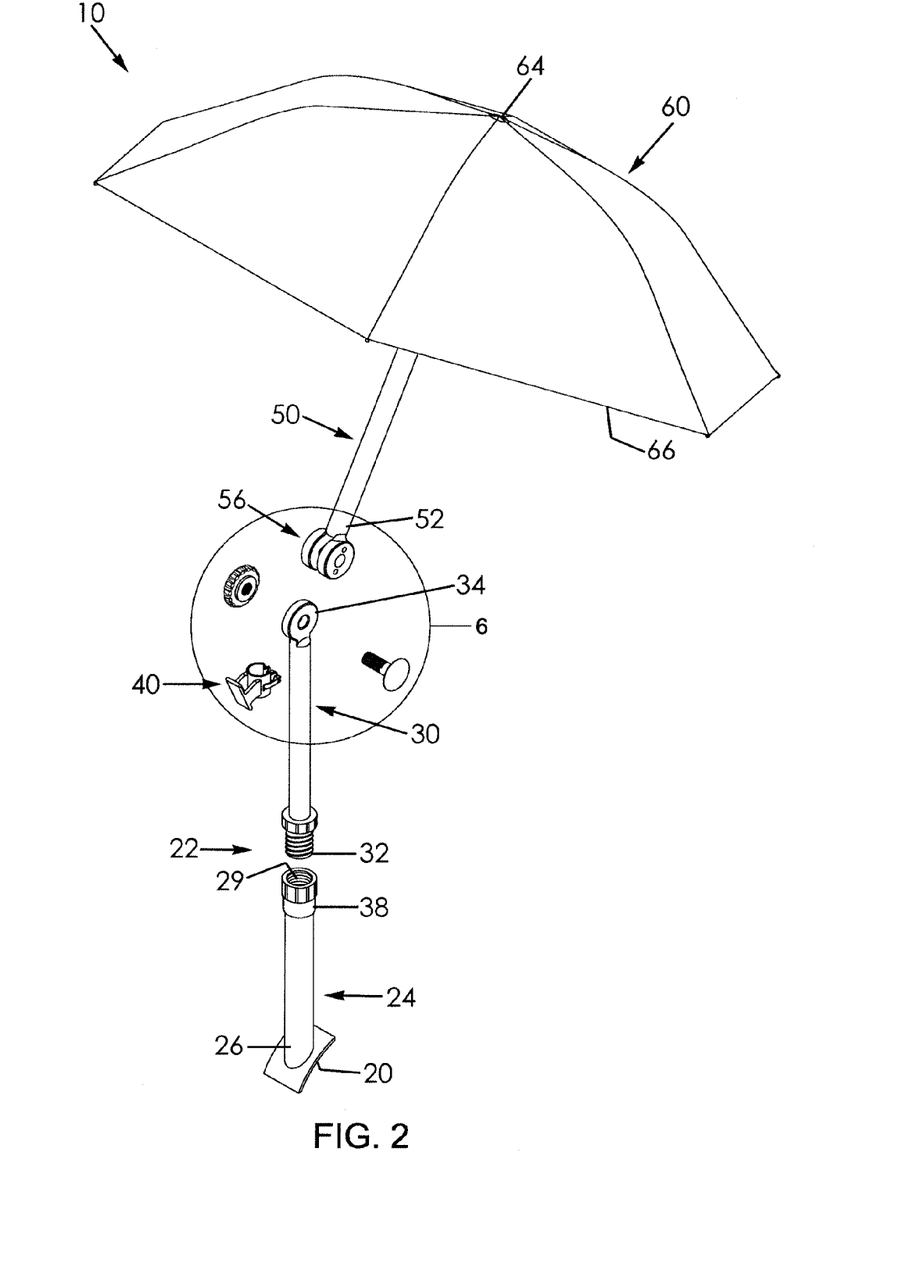
FIG. 2 is an exploded view of the umbrella apparatus as in FIG. 1.
Figure 3:
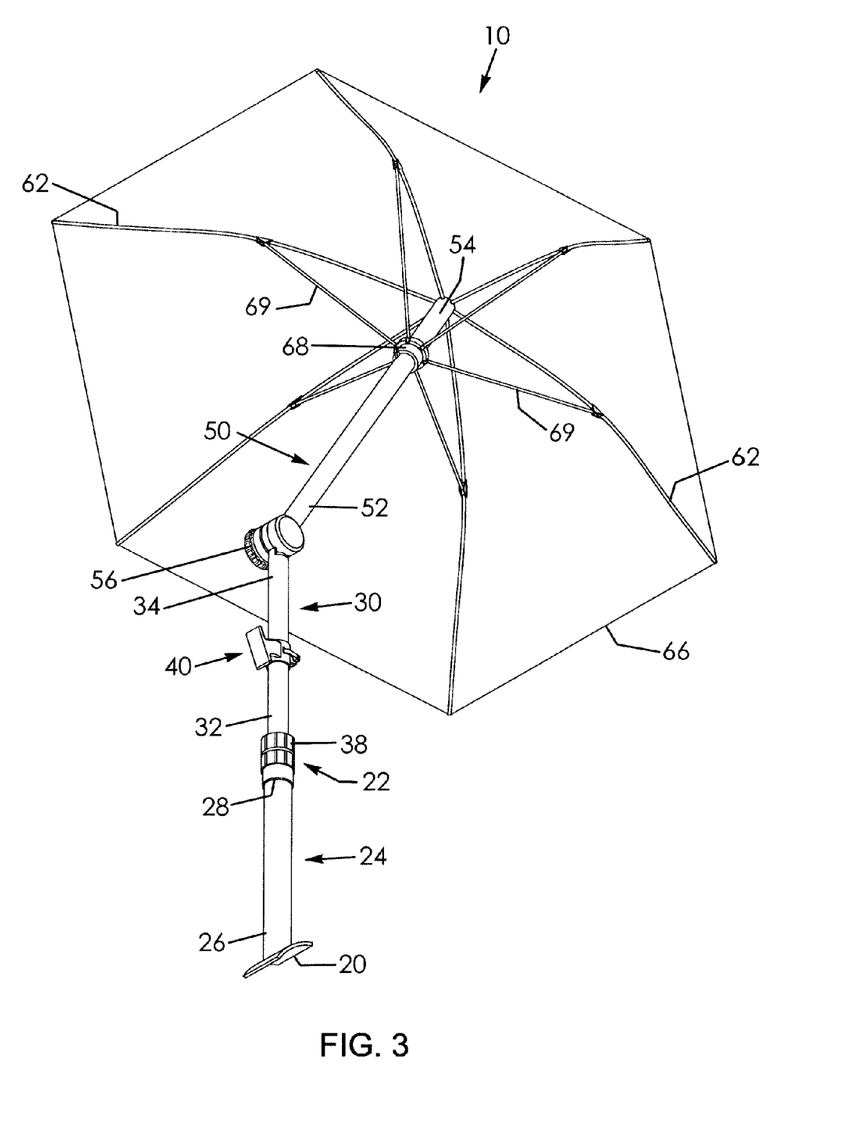
FIG. 3 is a lower perspective view of the umbrella apparatus as in FIG. 1.
Figure 4:
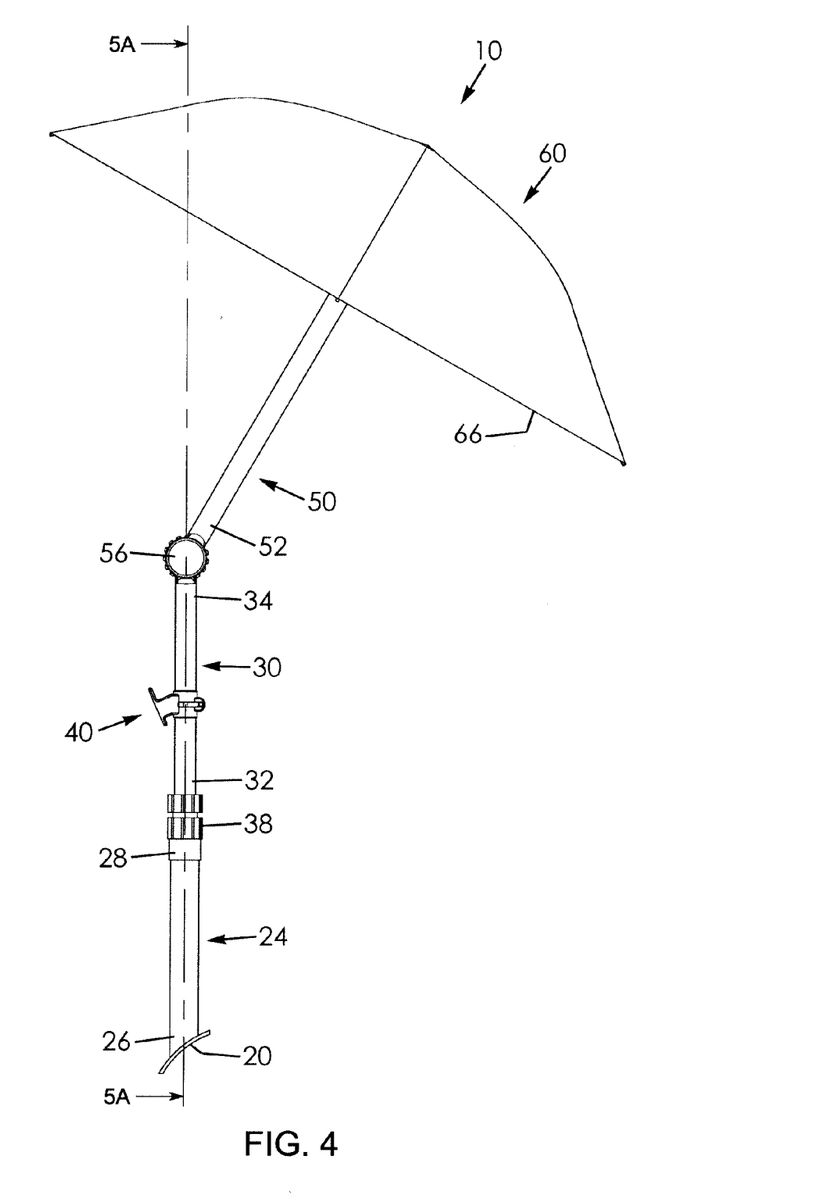
FIG. 4 is a side view of the umbrella apparatus as in FIG. 1.
Figure 5A:
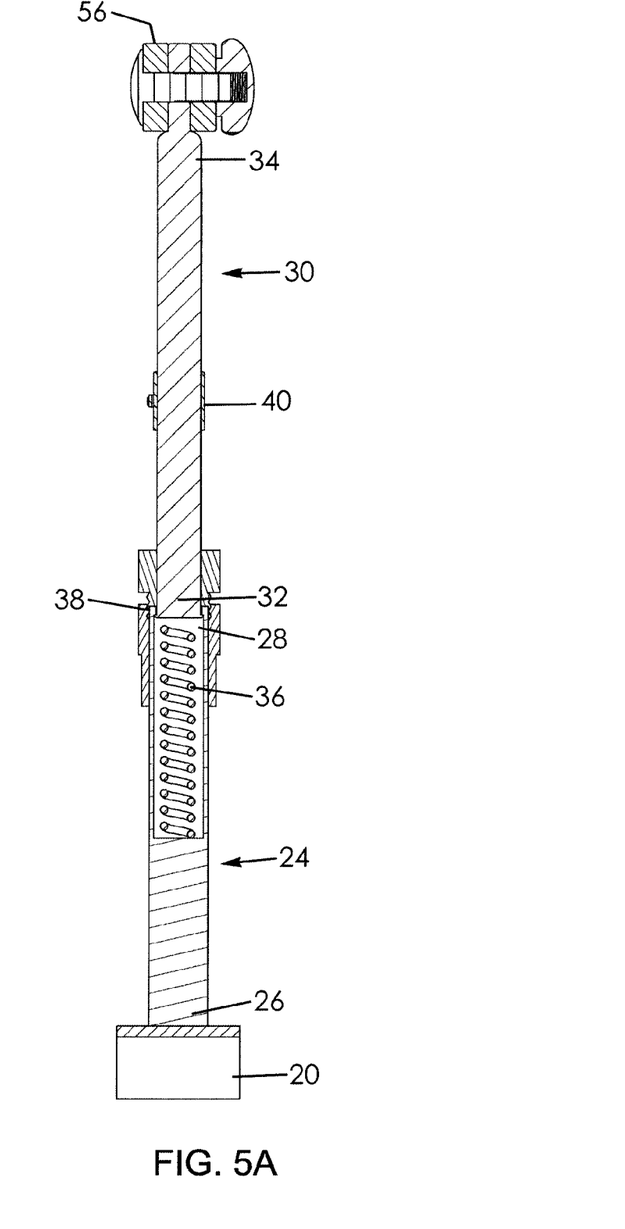
FIG. 5A is a section view taken along line 5A-5A of FIG. 4, illustrating a mounting shaft in an extended configuration.
Figure 5B:
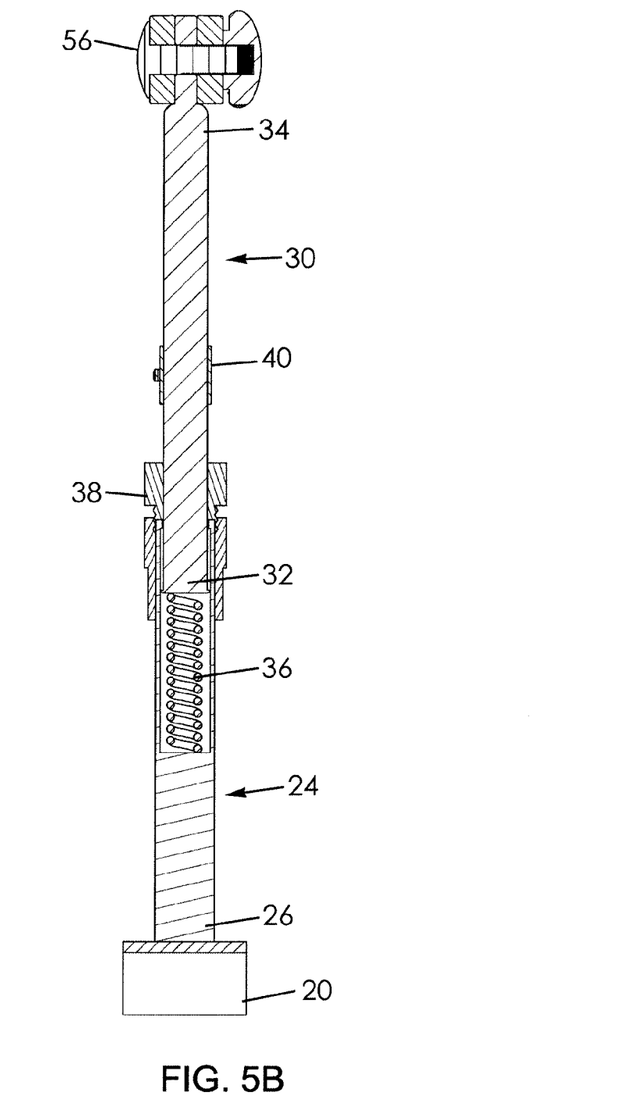
FIG. 5B is a section view as in FIG. 5B illustrating the mounting shaft in a compressed configuration
Figure 6:
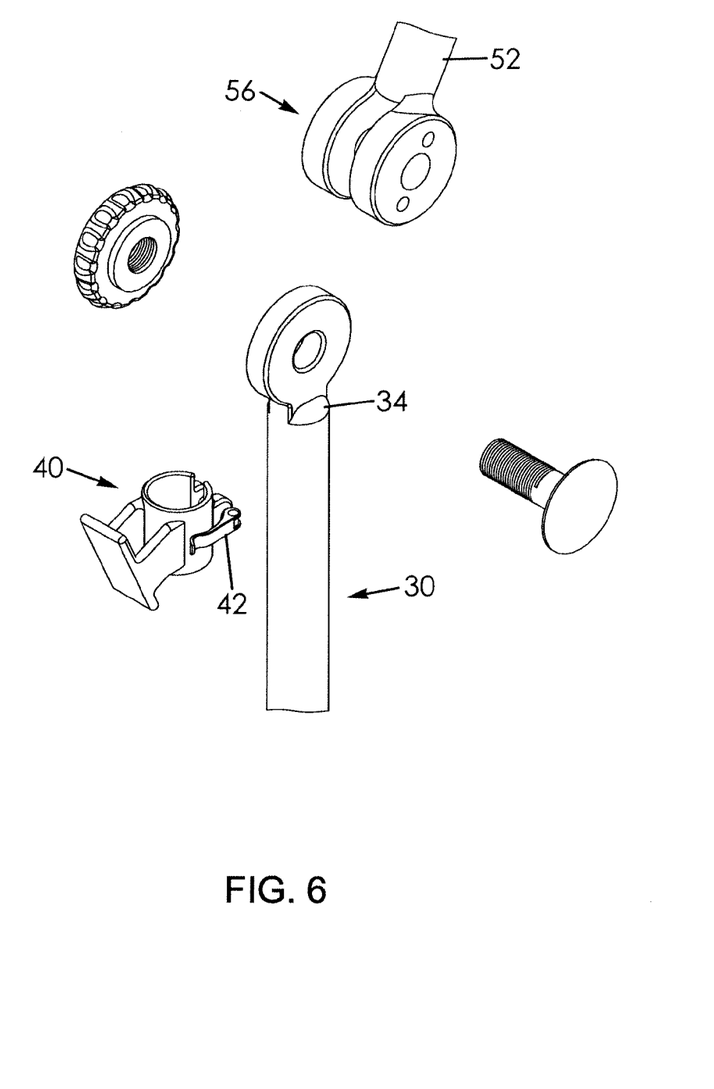
FIG. 6 is an isolated view on an enlarged scale taken from FIG. 2.
Figure 7:
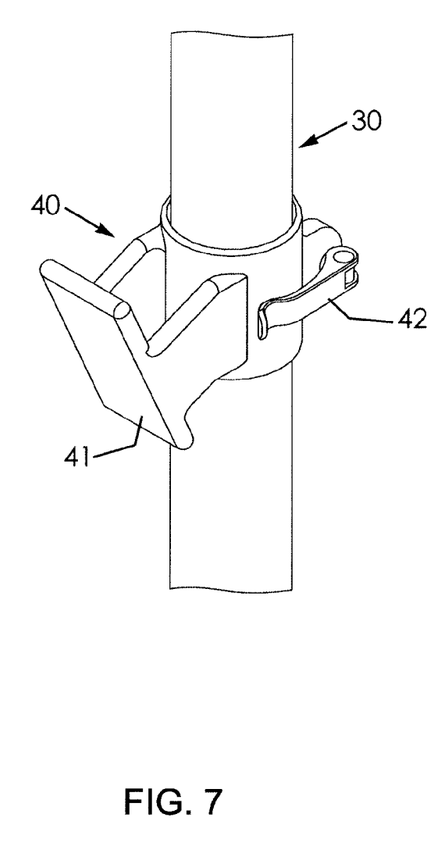
FIG. 7 is an isolated view on an enlarged scale taken from FIG. 1.

An automobile umbrella apparatus according to a preferred embodiment of the present invention will now be described with reference to FIGS. 1 to 7 of the accompanying drawings. The automobile umbrella apparatus 10 includes a base member 20, a mounting shaft 22, an umbrella pole 50, and an umbrella canopy 60. The umbrella apparatus 10 may be used in the manner of a traditional umbrella and may also be coupled to the window frame of an automobile to provide shelter or shade to the interior of the automobile. Specifically, the mounting shaft 22 may be coupled to any automobile door having a lower window frame member and an upper window frame member.

The base member 20 includes an arch shaped configuration that may be selectively positioned on the lower frame member of an automobile door. The base member 20 may also be described as having a concave configuration that is able to receive the lower window frame member. It is understood that some embodiments of the base member 20 may include other configurations suitable for use with automobiles having other lower window frame configurations.

The mounting shaft 22 has an elongate linear configuration that is length adjustable and can span between the lower and upper window frame members of an automobile door. The mounting shaft 22 has a lower end coupled to the base member 20 and extends upwardly therefrom. The mounting shaft 22 includes an upper end that may be coupled to an upper window frame member as will be explained in more detail below.

In an embodiment, the mounting shaft 22 includes a lower portion 24 and an upper portion 30 have tubular configurations that are telescopically coupled together and length adjustable. The upper portion 30 includes a first end 32 and an opposed second end 34. The second end 34 is the mounting shaft upper end referred to previously. The lower portion 24 includes a first end 26 and an opposed second end 28. The first end 26 is the mounting shaft lower end identified above and is coupled to the base member 20. The lower portion 24 defines an interior space and an open top 29 that provides access to the interior space. The lower portion 24 is dimensioned and configured to receive the first end 32 of the upper portion 30 into the interior space through the open top 29.

A compression spring 36 is positioned in the interior space of the lower portion 24 of the mounting shaft 22 and is in communication with the first end 32 of the upper portion 30 and normally biased to push the upper portion 30 upwardly and outwardly from the interior space. The upper portion 30 is slidably movable between a compressed configuration substantially inside the interior space and an extended configuration substantially outside of the interior space of the interior space of the lower portion 24. A mounting shaft clamp 38 is coupled to the lower portion 24 adjacent the open top 29. The mounting shaft clamp 38 is configured to secure the upper portion 30 and lower portion 24 together in a friction fit arrangement, such as by manually twisting/tightening the mounting shaft clamp 38 when the lower portion 24 and upper portion 30 are length adjusted to a desired length. It is understood that the spring 36 is biased to expand when not compressed or secured by the mounting shaft clamp 38.

The automobile umbrella apparatus 10 includes a mounting fin 40 coupled to the mounting shaft proximate the second end 34 of the upper portion 30. The mounting fin 40 has a wedge shape that is configured to selectively engage an upper window frame member of an automobile. The mounting fin 40 may be held in a forceful friction-fit engagement caused by the strong upward force exerted by the upwardly biased compression spring 36 against the upper portion 30 of the mounting shaft 22.

The mounting fin 40 may be slidably coupled to the upper portion 30 of the mounting shaft 22 and selectively movable therealong. This enables the mounting fin 40 to be adjusted according to the particular dimensions and configuration of an upper window frame member of an automobile door. The mounting fin 40 may also include a fin clamp 42 configured to tighten the mounting fin 40 at a selected vertical position along the upper portion 30 of the mounting shaft 22. In addition, the mounting fin 40 may include a fin adjustment portion 41 that is pivotal relative to the upper portion 30 so as to be used with upper window frame members of different configurations.

The umbrella pole 50 includes a proximal end 52 pivotally coupled to the upper end of the mounting shaft 22 or, in one embodiment described above, coupled to the second end 34 of the upper portion 30 of the mounting shaft 22. The umbrella pole 50 also includes a distal end 54 opposed to and displaced from the proximal end 52 such that the umbrella pole 50 includes a generally linear and elongate configuration. Once the umbrella pole 50 is pivotally positioned to a desired angle relative to the mounting shaft 22, it may be secured at the selected position. Specifically, a tilt clamp 56 may be positioned between the second end 34 of the upper portion 30 and the proximal end 52 of the umbrella pole 50 and selectively tightened to secure the upper portion 30 and umbrella pole 50 at the selected position.

With further reference to the umbrella canopy 60 and related components, a rib assembly includes a plurality of spaced apart linear ribs 62 positioned radially on a bottom surface of the canopy 60. Each rib 62 extends substantially between a canopy apex 64 and a canopy perimeter edge 66. Further, a hub 68 is slidably coupled to the umbrella pole 50 and is movable therealong toward or away from the canopy apex 64. A plurality of spokes 69 extend between the hub 68 and respective ribs 62, the spokes being arranged such that the canopy 60 is moved between a deployed configuration when the hub 68 is moved toward the umbrella pole distal end (i.e. toward the canopy apex 64) and a retracted configuration when the hub 68 is moved toward the proximal end 52 of the umbrella pole 50 (i.e. away from the canopy apex 64). Described another way, the umbrella canopy 60 is operatively coupled to the distal end 54 of the umbrella pole 50 and movable to the retracted configuration in which the umbrella canopy 60 is loosely surrounding the umbrella pole 50 and the deployed configuration in which the umbrella canopy 60 extends away from the umbrella pole 50 so as to shield or shade an area under the canopy 60, such as the window of an automobile.

In use, the automobile umbrella apparatus 10 may be operated in the manner of a traditional umbrella. Namely, user may grasp the lower portion 24 of the mounting shaft 22 and hold it vertically and the canopy 60 may be moved to the deployed configuration—thus using the canopy to shade a user from sun, rain, or other natural elements. Alternatively, the automobile umbrella apparatus 10 may be mounted to the window frame of a door of an automobile. First, the window should be completely lowered. Then, the base member 20 may be nested atop the lower window frame member. The mounting shaft clamp 38 may be released such that the compression spring 36 is allowed to push upwardly on the upper portion 30 of the mounting shaft 22. Then, the mounting fin 40 may be positioned to forcefully bear against the upper window frame member. To maintain this positioning, the mounting shaft clamp 38 may be tightened. The umbrella pole 50 may be angularly positioned and the umbrella canopy 60 deployed as described above. Once deployed, the umbrella canopy provides shade to the open window or shields the open window from rain.

It is understood that while certain forms of this invention have been illustrated and described, it is not limited thereto except insofar as such limitations are included in the following claims and allowable functional equivalents thereof.

The invention claimed is:

1. An automobile umbrella apparatus for attachment to an automobile door having opposed lower and upper window frame members, said automobile umbrella apparatus comprising:

a base member having an arch shape configured to selectively nest atop the lower window frame of an automobile;

a mounting shaft having a lower end coupled to said base member and an opposed upper end displaced from said lower end, said mounting shaft being length adjustable to span between the lower and upper window frame members;

a mounting fin coupled to said mounting shaft proximate said upper end and having a wedge shape configured to engage the upper window frame member in a friction fit relationship;

an umbrella pole having a proximal end pivotally coupled to said upper end of said mounting shaft and a distal end displaced from said proximal end; and a umbrella canopy operatively coupled to said distal end of said umbrella pole and movable between a retracted configuration loosely surrounding said umbrella pole and a deployed configuration extending away from said umbrella pole so as to shield or shade an area thereunder.

2. The automobile umbrella apparatus as in claim 1, wherein said mounting shaft includes:

an upper portion having opposed first and second ends;

a lower portion having a tubular configuration defining an interior space and an open top, said lower portion configured to selectively receive said upper portion into said interior space through said open top; and a spring positioned in said lower portion and in communication with said first end of said upper portion, said spring being normally biased to exert an outward force to push said upper portion out of said interior space.

3. The automobile umbrella apparatus as in claim 2, wherein said upper portion of said mounting shaft is slidably movable between a compressed configuration substantially inside said interior space of said lower portion and an extended configuration substantially outside of said interior space of said lower portion such that said mounting shaft is length adjustable.

4. The automobile umbrella apparatus as in claim 3, further comprising a mounting shaft clamp situated adjacent said open top of said lower portion and operable to secure said upper portion and said lower portion at a selected length adjusted configuration in a friction-fit arrangement.

5. The automobile umbrella apparatus as in claim 2, wherein said mounting fin is slidably coupled to said upper portion of said mounting shaft and selectively movable therealong, said mounting fin having a fin clamp selectively tightened to secure said mounting fin at a desired position.

6. The automobile umbrella apparatus as in claim 5, wherein said mounting fin includes an adjustment portion that is pivotal so as to conform to a configuration of the upper window frame member.

7. The automobile umbrella apparatus as in claim 1, wherein said proximal end of said umbrella pole is pivotally coupled to said upper end of said mounting shaft with an tilt clamp situated at said top end of said lower portion and operable to secure said umbrella pole at a selected angle.

8. The automobile umbrella apparatus as in claim 1, further comprising:

a rib assembly having a plurality of spaced apart ribs positioned radially on a bottom surface of said umbrella canopy, each rib extending between a canopy apex and a canopy perimeter edge;

a hub slidably coupled to said umbrella pole and selectively movable therealong; and a plurality of spokes extending between said hub and respective ribs, said plurality of spokes being arranged so as to cause said canopy to move toward said deployed configuration when said hub is moved toward said umbrella pole distal end and causing said canopy to move toward said retracted configuration when said hub is moved toward said umbrella pole proximal end.

9. The automobile umbrella apparatus as in claim 2, wherein said spring is a compression spring that is naturally biased to expand when not compressed.

10. The automobile umbrella apparatus as in claim 2, wherein said upper portion and said lower portion of said mounting shaft are telescopically connected and length adjustable.

11. An automobile umbrella apparatus for attachment to an automobile door having opposed lower and upper window frame members, said automobile umbrella apparatus comprising:

a base member configured to selectively receive the lower window frame of an automobile;

a mounting shaft comprising:

an upper portion having a first end and an opposed second end upwardly displaced from said first end;

a lower portion having a tubular configuration having a first end coupled to said base member, said lower portion defining an interior space and an open top such that said lower portion is configured to selectively receive said first end of said upper portion into said interior space through said open top;

a spring positioned in said lower portion and in communication with said first end of said upper portion, said spring being normally biased to exert an outward force to push said upper portion out of said interior space;

a mounting fin coupled to said mounting shaft proximate said second end of said upper potion, said mounting fin having a wedge shape configured to engage the upper window frame member in a friction fit relationship;

an umbrella pole having a proximal end pivotally coupled to said upper end of said mounting shaft and a distal end displaced from said proximal end; and a umbrella canopy operatively coupled to said distal end of said umbrella pole and movable between a retracted configuration loosely surrounding said umbrella pole and a deployed configuration extending away from said umbrella pole so as to shield or shade an area thereunder.

12. The automobile umbrella apparatus as in claim 11, wherein said upper portion of said mounting shaft is slidably movable between a compressed configuration substantially inside said interior space of said lower portion and an extended configuration substantially outside of said interior space of said lower portion such that said mounting shaft is length adjustable.

13. The automobile umbrella apparatus as in claim 12, further comprising a mounting shaft clamp situated adjacent said open top of said lower portion and operable to secure said upper portion and said lower portion at a selected length adjusted configuration in a friction-fit arrangement.

14. The automobile umbrella apparatus as in claim 11, wherein said mounting fin is slidably coupled to said upper portion of said mounting shaft and selectively movable therealong, said mounting fin having a fin clamp selectively tightened to secure said mounting fin at a desired position.

15. The automobile umbrella apparatus as in claim 14, wherein said mounting fin includes an adjustment portion that is pivotal so as to conform to a configuration of the upper window frame member.

16. The automobile umbrella apparatus as in claim 11, wherein said proximal end of said umbrella pole is pivotally coupled to said upper end of said mounting shaft with an tilt clamp situated at said top end of said lower portion and operable to secure said umbrella pole at a selected angle.

17. The automobile umbrella apparatus as in claim 11, further comprising a:
a rib assembly having a plurality of spaced apart ribs positioned radially on a bottom surface of said umbrella canopy, each rib extending between a canopy apex and a canopy perimeter edge;
a hub slidably coupled to said umbrella pole and selectively movable therealong; and
a plurality of spokes extending between said hub and respective ribs, said plurality of spokes being arranged so as to cause said canopy to move toward said deployed configuration when said hub is moved toward said umbrella pole distal end and causing said canopy to move toward said retracted configuration when said hub is moved toward said umbrella pole proximal end.

18. The automobile umbrella apparatus as in claim 11, wherein said spring is a compression spring that is naturally biased to expand when not compressed.

19. The automobile umbrella apparatus as in claim 15, further comprising a:
a rib assembly having a plurality of spaced apart ribs positioned radially on a bottom surface of said umbrella canopy, each rib extending between a canopy apex and a canopy perimeter edge;
a hub slidably coupled to said umbrella pole and selectively movable therealong; and
a plurality of spokes extending between said hub and respective ribs, said plurality of spokes being arranged so as to cause said canopy to move toward said deployed configuration when said hub is moved toward said umbrella pole distal end and causing said canopy to move toward said retracted configuration when said hub is moved toward said umbrella pole proximal end.

20. The automobile umbrella apparatus as in claim 11, wherein said upper portion and said lower portion of said mounting shaft are telescopically connected and length adjustable.

* * * * *